US012647875B2

(12) United States Patent
Manithara Vamanan et al.

(10) Patent No.: US 12,647,875 B2
(45) Date of Patent: Jun. 2, 2026

(54) PERSONAL INTERNET-OF-THINGS NETWORK DISCOVERY

(71) Applicant: Apple Inc., Cupertino, CA (US)

(72) Inventors: Sudeep Manithara Vamanan, Uttenreuth (DE); Behrouz Aghili, San Diego, CA (US); Biljana Badic, Munich (DE); Haijing Hu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 18/188,636

(22) Filed: Mar. 23, 2023

(65) Prior Publication Data

US 2023/0308986 A1    Sep. 28, 2023

Related U.S. Application Data

(60) Provisional application No. 63/362,006, filed on Mar. 28, 2022.

(51) Int. Cl.
*H04W 48/08* (2009.01)
*H04W 84/18* (2009.01)
(52) U.S. Cl.
CPC ............ *H04W 48/08* (2013.01); *H04W 84/18* (2013.01)
(58) Field of Classification Search
CPC ..... H04W 48/08; H04W 84/18; H04W 12/06; H04W 4/70; H04L 67/51; H04L 41/12; H04L 63/062; H04L 63/065; H04L 63/0892
See application file for complete search history.

(56) References Cited

U.S. PATENT DOCUMENTS

| | | | | |
|---|---|---|---|---|
| 11,832,277 | B2 * | 11/2023 | Byun | H04W 76/40 |
| 12,238,783 | B2 * | 2/2025 | Narasimha | H04W 72/0446 |
| 12,414,181 | B2 * | 9/2025 | Sugawara | H04W 76/12 |
| 2009/0063686 | A1 * | 3/2009 | Schmidt | H04L 67/54 709/227 |
| 2016/0226845 | A1 * | 8/2016 | Kim | H04W 12/04 |
| 2019/0089693 | A1 * | 3/2019 | Ding | G06F 21/44 |

(Continued)

FOREIGN PATENT DOCUMENTS

WO      2022/271957      12/2022

OTHER PUBLICATIONS

3rd Generation Partnership Project: "Technical Specification Group Services and System Aspects; Study on architecture enhancements for Personal IoT Network (PIN)", 3GPP TR 23.700-88, V0.1.0, Mar. 3, 2022, 12 sheets.

(Continued)

*Primary Examiner* — Cindy Trandai
(74) *Attorney, Agent, or Firm* — Fay Kaplun & Marcin, LLP

(57)      ABSTRACT

A Internet of things (IoT) network (PIN) element is configured to receive, from a PIN element management capability (PEMC) device, an announcement comprising a PIN identifier, a list of services available via the PIN and a time limit for responding to the announcement, send, to the PEMC in response to the announcement, a PIN join request comprising one or more services provided by the PIN element and receive, from the PEMC in response to the PIN join request, a PIN join accept message comprising a PIN Element Identifier assigned to the PIN element.

20 Claims, 9 Drawing Sheets

(56) References Cited

U.S. PATENT DOCUMENTS

| | | | | |
|---|---|---|---|---|
| 2019/0230503 A1* | 7/2019 | Circosta | | H04W 12/50 |
| 2019/0349426 A1* | 11/2019 | Smith | | H04L 63/123 |
| 2019/0394619 A1* | 12/2019 | Gholmieh | | H04W 4/06 |
| 2020/0008131 A1 | 1/2020 | Chakraborty et al. | | |
| 2020/0015043 A1 | 1/2020 | Patil et al. | | |
| 2020/0037035 A1* | 1/2020 | Kaufman | | H04L 65/612 |
| 2020/0068369 A1* | 2/2020 | Liao | | H04W 4/06 |
| 2020/0107402 A1* | 4/2020 | Di Girolamo | | H04W 88/16 |
| 2020/0323024 A1* | 10/2020 | Huang | | H04W 4/06 |
| 2021/0368341 A1* | 11/2021 | Liao | | H04W 12/72 |
| 2022/0030407 A1* | 1/2022 | Bercovici | | H04W 48/18 |
| 2022/0086775 A1* | 3/2022 | Wang | | H04W 56/0015 |
| 2022/0132409 A1* | 4/2022 | Chavez | | H04L 63/0815 |
| 2022/0191254 A1* | 6/2022 | Parasseeri | | H04L 65/1069 |
| 2022/0210165 A1* | 6/2022 | Rosas Bustos | | H04L 67/12 |
| 2022/0287116 A1* | 9/2022 | Kim | | H04W 76/12 |
| 2022/0353149 A1* | 11/2022 | Zhang | | H04L 45/04 |
| 2023/0052699 A1* | 2/2023 | Ninglekhu | | H04W 48/16 |
| 2023/0189121 A1* | 6/2023 | Hedman | | H04W 4/021 |
| | | | | 370/329 |
| 2023/0308450 A1* | 9/2023 | Yoon | | H04L 63/102 |
| 2023/0345310 A1* | 10/2023 | Li | | H04W 72/30 |
| 2024/0023007 A1* | 1/2024 | Thiebaut | | H04W 60/00 |
| 2024/0137416 A1* | 4/2024 | Salkintzis | | H04W 4/70 |
| 2024/0196449 A1* | 6/2024 | Paladugu | | H04W 76/14 |
| 2024/0276360 A1* | 8/2024 | Atarius | | H04W 48/18 |
| 2024/0305980 A1* | 9/2024 | Ferdi | | H04W 76/14 |
| 2025/0008605 A1* | 1/2025 | Zhou | | H04W 48/16 |
| 2025/0016654 A1* | 1/2025 | Zhou | | H04W 76/12 |
| 2025/0212269 A1* | 6/2025 | Liu | | H04W 12/009 |

OTHER PUBLICATIONS

3rd Generation Partnership Project: "Universal Mobile Telecommunications System (UMTS); UE Radio Transmission and Reception (FDD)"; TS 25.101, Version 4.2.0, Release 4, Sep. 23, 2021, 71 sheets.

Vivo et al., "New WID on Study on Personal IoT networks"; 3GPP SA WG1 Meeting #90-e, S1-202145, May 8, 2020, 3 sheets.

* cited by examiner

PERSONAL INTERNET-OF-THINGS NETWORK DISCOVERY

PRIORITY/INCORPORATION BY REFERENCE

This application claims priority to U.S. Provisional Application 63/362,006 filed on Mar. 28, 2022 and entitled "PERSONAL INTERNET-OF-THINGS NETWORK DISCOVERY," the entirety of which is incorporated herein by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

Some exemplary embodiments are related to a processor of a personal Internet of things (IoT) network (PIN) element configured to receive, from a PIN element management capability (PEMC) device, an announcement comprising a PIN identifier, a list of services available via the PIN and a time limit for responding to the announcement, send, to the PEMC in response to the announcement, a PIN join request comprising one or more services provided by the PIN element and receive, from the PEMC in response to the PIN join request, a PIN join accept message comprising a PIN Element Identifier assigned to the PIN element.

Other exemplary embodiments are related to a processor of a personal Internet of things (IoT) network (PIN) management capability (PEMC) device configured to send an announcement comprising a PIN identifier, a list of services available via the PIN and a time limit for responding to the announcement, receive, from a PIN element in response to the announcement, a PIN join request comprising one or more services provided by the PIN element and send, to the PIN element in response to the PIN join request, a PIN join accept message comprising a PIN Element Identifier assigned to the PIN element.

DETAILED DESCRIPTION

Figure 1:
FIG. 1 illustrates an example system that includes personal Internet of things (IoT) networks (PINs) according to various exemplary embodiments.

The exemplary embodiments may be further understood with reference to the following description and the related appended drawings, wherein like elements are provided with the same reference numerals. The exemplary embodiments relate to improvements for a personal Internet of things (IoT) network (PIN) element to join a PIN network.

The exemplary embodiments are described with regard to a UE. However, reference to a UE is merely provided for illustrative purposes. The exemplary embodiments may be utilized with any electronic component that may establish a connection to a network or other devices and is configured with the hardware, software, and/or firmware to exchange information and data with the network or other devices. Therefore, the UE as described herein is used to represent any electronic component.

The exemplary embodiments are also described with reference to a 5G New Radio (NR) network. However, it should be understood that the exemplary embodiments may also be implemented in other types of networks, including but not limited to legacy cellular networks, LTE networks, future evolutions of the cellular protocol (e.g., 6G networks), or any other type of network.

One of the features being developed by the 3rd Generation Partnership Project (3GPP) is a personal Internet of things (IoT) network (PIN). A PIN can be operated in co-operation with a home public land mobile network (PLMN) provided by a mobile network operator (MNO). As an example, a PIN can be operated in co-operation with a 3GPP 5th Generation System (5GS). A PIN can include, among other things, cellular user equipment (UE) and IoT devices. Among many examples, IoT devices include machine-type communication (MTC) devices, vehicle-to-everything (V2X) devices, and wearable devices. A device that part of a PIN is referred to as an "element" of that PIN.

One of the elements in PIN has an active management capability (PEMC) and the same element or another element may have an active gateway capability (PEGC). A PEMC is responsible for managing a PIN, and a PEGC is responsible for routing communications between the PIN and external systems (e.g., a 5GS or a cloud server). Generally, a PIN element can be any wireless device and is not restricted to being a 3GPP-based wireless device. However, a PIN element that serves as a PEMC, a PEGC, or both is a 3GPP-based wireless device (or a 3GPP compatible device) so that the element can communicate with a network associated with the PIN.

Some of the PIN features provisioned by 3GPP include that a PIN element can be authenticated without using 3GPP credentials, a PIN element can be a member of different PINs, a PIN element is not required to be a subscriber to the same MNO as the PIN element(s) serving as PEGC/PEMC, and communication between the elements could be using non-3GPP methods (e.g., Bluetooth®, Wi-Fi, WLAN, etc.) or 3GPP methods (e.g., ProSe PC5 Sidelink). However, PINs remain under development and there are currently many unaddressed challenges facing PIN adoption.

The exemplary embodiments disclosed herein address many of the open challenges facing PIN adoption. The exemplary embodiments address issues related to PIN Discovery and Selection. The exemplary embodiments propose methods for PIN element discovery and PIN selection, PEGC discovery in a PIN, and discoverability of PIN elements in a PIN. This disclosure also describes methods and systems for implementing the exemplary embodiments.

FIG. 1 illustrates an example system 130 that includes personal Internet of things (IoT) networks (PINs) 100 and 102, according to some embodiments. PINs 100, 102 are operated in co-operation with an associated wireless communication system. For purposes of convenience and without limitation, the system 130 is described in the context of Fifth Generation (5G) New Radio (NR) communication standards as defined by the Third Generation Partnership Project (3GPP) technical specifications. For example, the wireless communication system associated with PINs 100, 102 may be a 5G system (5GS). However, other types of communication systems are possible, including legacy 3GPP systems, e.g., Long Term Evolution (LTE) systems, and future 3GPP systems (e.g., Sixth Generation [6G]) systems, IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In some embodiments, PINs 100, 102 may be smart home networks, networks of wearable devices, or other types of networks. As shown in FIG. 1, PIN 100 (also labeled as "PIN1") and PIN 102 (also labeled as "PIN2") include a plurality of elements. In some embodiments, a device can be an element of more than one PIN. In the example of FIG. 1, UE 106 is an element of both PINs 100, 102. PIN 100 also includes element 104 (also labeled as "E1"), and PIN 102 also includes element 108 (also labeled as "E2") and element 110 (also labeled as "E3"). In the system 130, UE 106 is a 3GPP-based device and elements 104, 108, 110 may be 3GPP-based devices or non-3GPP-based devices. Furthermore, UE 106 is configured as both PEGC and PEMC of PINs 100, 102. As such, UE 106 serves as a gateway between PINs 100, 102 and external systems. In FIG. 1, UE 106 serves as a gateway between PINs 100, 102 and the associated 5GS by way of radio access network (RAN) 114. UE 106 can also serve as a gateway to other external systems, such as cloud 112. As shown in FIG. 1, UE 106 uses links 116, 118, 120, 122, 124 to communicate with E1, E2, E3, cloud 112, and RAN 114, respectively.

In an example, PINs 100, 102 can be created by a user, e.g., using a PEMC UE. In another example, PINs 100, 102 can be created by an application function (AF) dedicated to PINs (also referred to as a "PIN AF"). In yet another example, PINs 100, 102 can be created by the 5GS associated with the PINs. As described in more detail below, the 5GS can also manage provisioning of PIN policies, authentication of elements, and onboarding of elements for PINs 100, 102.

In some embodiments, PINs 100, 102 are each assigned one or more attributes, e.g., upon creation of the PIN. A PIN attribute is indicative of an operating characteristic of the corresponding PIN. The attributes, which can be provided to the 5GS, enable the MNO to better serve the PIN, for instance, by customizing the service provided to the PIN based on the PIN's attributes. As an example, the MNO can define and assign policies for a PIN based on that PIN's attributes. More specifically, the MNO may allow only certain type of PINs to operate in co-operation with the 5GS, the MNO may provide different services to different types of PINs, and/or the MNO may assign different priorities to different types of PINs.

In some embodiments, the PIN attributes include a PIN class (e.g., an indication of the type of devices in the PIN), a PIN traffic scope (e.g., an indication of the location of the PIN's traffic), a PIN traffic class (e.g., priority of the PIN traffic), and a PIN size (e.g., an indication of a size of the PIN). The categories within the PIN class include a private PIN (e.g., home network), a public PIN (e.g., shopping mall), and a personal body area PIN (e.g., smart watch, smart glasses). The categories within the PIN traffic scope include: (i) local (e.g., traffic flow is preserved within the PIN), (ii) partially local (e.g., some elements send traffic to the associated 5GS), and (iii) cloud (e.g., PIN elements communicate with a cloud server). The categories within the PIN traffic class include high priority traffic and low priority traffic. The PIN size is a size of the PIN to be shared with the network. The size of PIN can be defined in different ways, e.g., number of elements (an exact number or a range), an aggregated load of the PIN, duty cycle of the elements of the PIN, among other examples. Other PIN attributes and categories within PIN attributes are possible and contemplated herein.

In some embodiments, the elements of a PIN are configured with a PIN layer that serves as a common interface for exchanging information between the PIN elements. Specifically, the PIN layer can be used to exchange information between PINs that may have different communication protocols. Thus, the PIN layer enables the devices to seamlessly communicate within the PIN. For example, the PIN layer output can be provided to the PEGC/PEMC device(s), which, as stated previously, are 3GPP compatible and can communicate with the associated 5GS.

Figure 2:
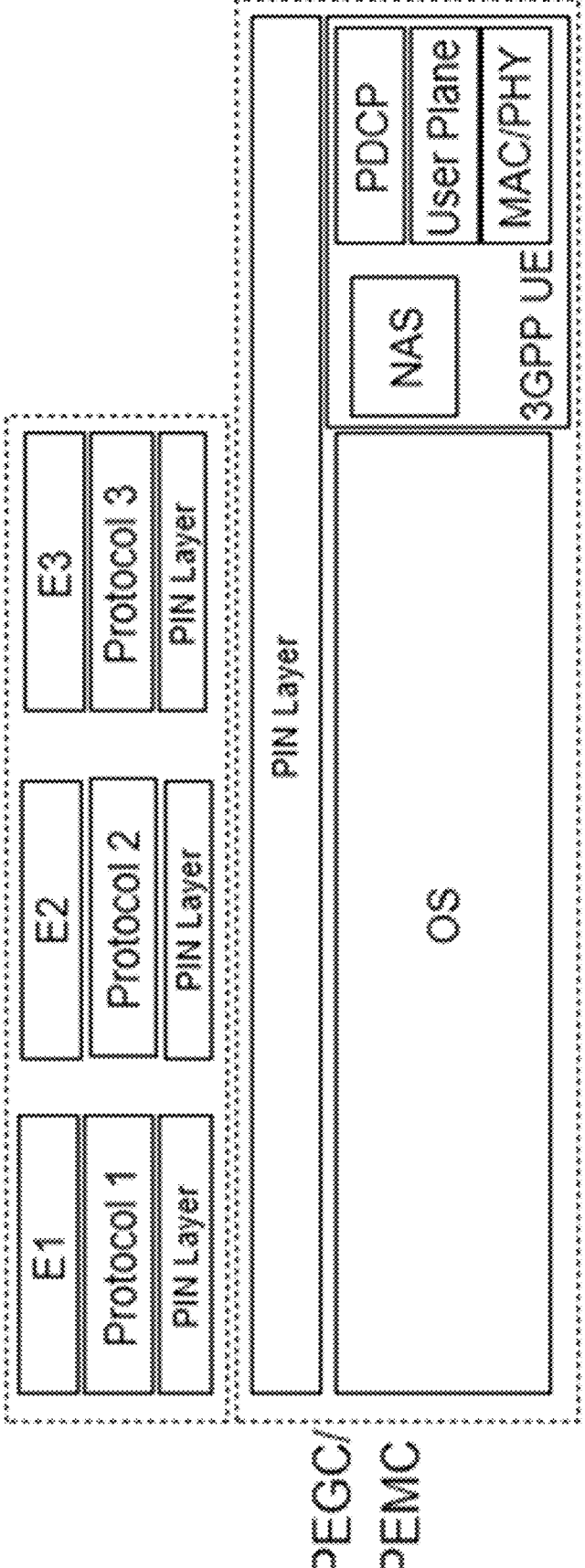
FIG. 2 illustrates a common interface for PIN elements according to various exemplary embodiments.

FIG. 2 illustrates a common interface for PIN elements, according to some embodiments. In an example, E1, E2, E3, and UE are similar to E1, E2, E3, and UE 106, respectively, of FIG. 1. As shown in FIG. 2, each PIN element includes a respective PIN layer in addition to the respective PIN element's protocol. For example, in addition to Protocol 1, E1 also includes a respective PIN layer. The respective PIN layers interface with the respective protocol layers and with each other.

In some embodiments, the 5GS associated with a PIN performs authorization and policy provisioning processes for the PINs. As described in more detail below, the authorization and policy provisioning processes can be initiated by a UE that is serving as PEGC. The authorization and policy provisioning processes may use that UE's subscription data. In some examples, a UE's subscription data includes (i) an authorization to act as a PEGC and/or a PEMC, and/or (ii) information indicating whether the UE is allowed to dynamically request creation of a new PIN. The authorization to act as PEGC and/or PEMC may be an open authorization (e.g., a UE has authorization to act as PEGC and/or PEMC for any PIN) or may be a restricted authorization (e.g., a UE has authorization to act as PEGC and/or PEMC for specific PINs).

Figure 3:
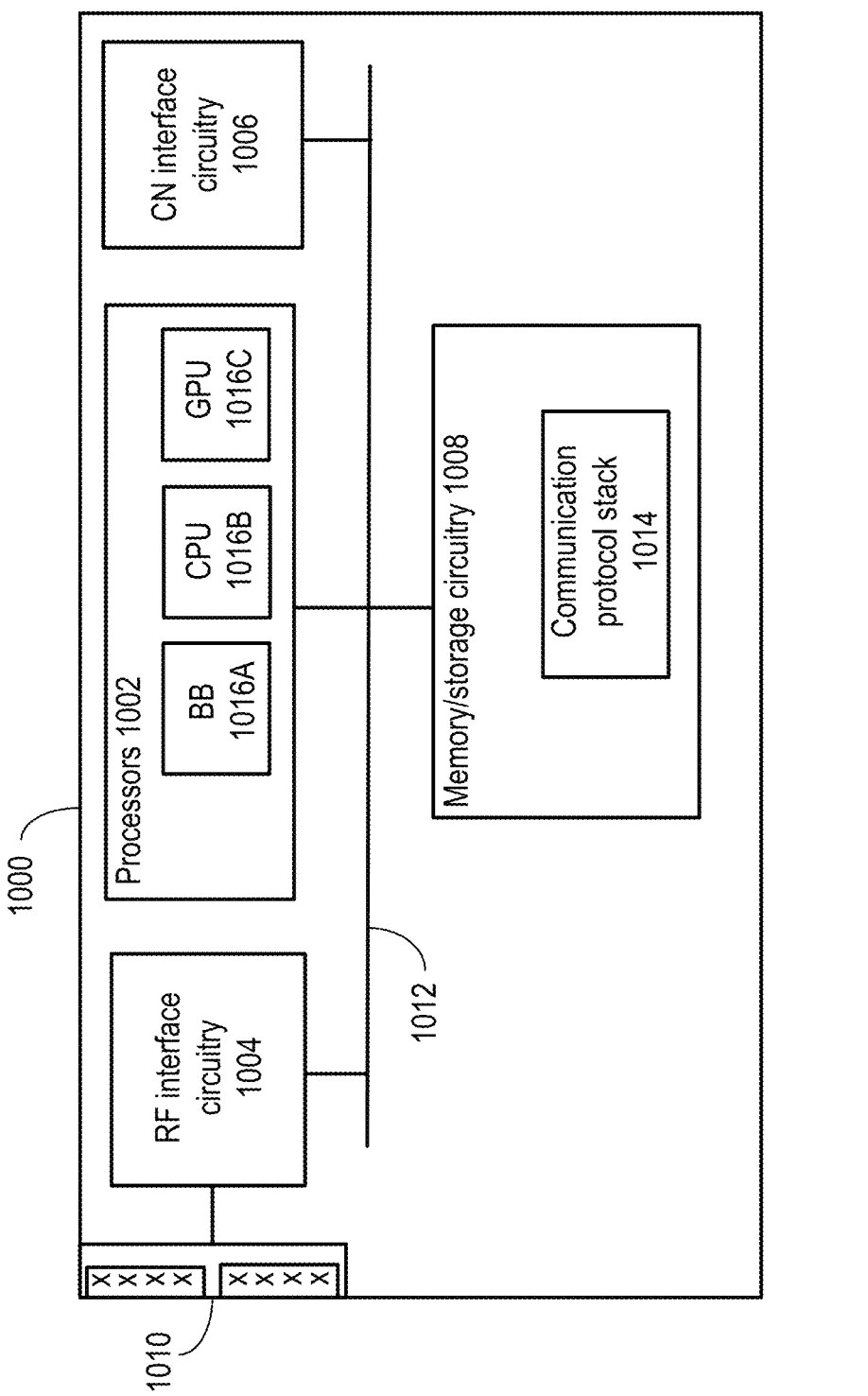
FIG. 3 illustrates a user equipment (UE) according to various exemplary embodiments.

FIG. 3 illustrates a UE 1000, in accordance with some embodiments. The UE 1000 may be similar to and substantially interchangeable with UE 106 of FIG. 1.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1000 may include processors 1002, RF interface circuitry 1004, memory/storage 1006, user interface 1008, sensors 1010, driver circuitry 1012, power management integrated circuit (PMIC) 1014, antenna structure 1016, and battery 1018. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1020, which may represent any type of interface, input/output, bus (local, system, or expansion), transmission line, trace, optical connection, etc. that allows various circuit components (on common or different chips or chipsets) to interact with one another.

The processors 1002 may include processor circuitry such as, for example, baseband processor circuitry (BB) 1022A, central processor unit circuitry (CPU) 1022B, and graphics processor unit circuitry (GPU) 1022C. The processors 1002 may include any type of circuitry or processor circuitry that executes or otherwise operates computer-executable instructions, such as program code, software modules, or functional processes from memory/storage 1006 to cause the UE 1000 to perform operations as described herein.

In some embodiments, the baseband processor circuitry 1022A may access a communication protocol stack 1024 in the memory/storage 1006 to communicate over a 3GPP compatible network. In general, the baseband processor circuitry 1022A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1004. The baseband processor circuitry 1022A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1006 may include one or more non-transitory, computer-readable media that includes instructions (for example, communication protocol stack 1024) that may be executed by one or more of the processors 1002 to cause the UE 1000 to perform various operations described herein. The memory/storage 1006 include any type of volatile or non-volatile memory that may be distributed throughout the UE 1000. In some embodiments, some of the memory/storage 1006 may be located on the processors 1002 themselves (for example, L1 and L2 cache), while other memory/storage 1006 is external to the processors 1002 but accessible thereto via a memory interface. The memory/storage 1006 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1004 may include transceiver circuitry and radio frequency front module (RFEM) that allows the UE 1000 to communicate with other devices over a radio access network. The RF interface circuitry 1004 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1016 and proceed to filter and amplify (with a low-noise amplifier) the signal. The signal may be provided to a receiver of the transceiver that downconverts the RF signal into a baseband signal that is provided to the baseband processor of the processors 1002.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1016.

In various embodiments, the RF interface circuitry 1004 may be configured to transmit/receive signals in a manner compatible with NR access technologies.

The antenna 1016 may include antenna elements to convert electrical signals into radio waves to travel through the air and to convert received radio waves into electrical signals. The antenna elements may be arranged into one or more antenna panels. The antenna 1016 may have antenna panels that are omnidirectional, directional, or a combination thereof to enable beamforming and multiple input, multiple output communications. The antenna 1016 may include microstrip antennas, printed antennas fabricated on the surface of one or more printed circuit boards, patch antennas, phased array antennas, etc. The antenna 1016 may have one or more panels designed for specific frequency bands including bands in FRI or FR2.

The user interface 1008 includes various input/output (I/O) devices designed to enable user interaction with the UE 1000. The user interface 1008 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1000.

The sensors 1010 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1012 may include software and hardware elements that operate to control particular devices that are embedded in the UE 1000, attached to the UE 1000, or otherwise communicatively coupled with the UE 1000. The driver circuitry 1012 may include individual drivers allowing other components to interact with or control various input/output (I/O) devices that may be present within, or connected to, the UE 1000. For example, driver circuitry 1012 may include a display driver to control and allow access to a display device, a touchscreen driver to control and allow access to a touchscreen interface, sensor drivers to obtain sensor readings of sensor circuitry 1028 and control and allow access to sensor circuitry 1028, drivers to obtain actuator positions of electro-mechanic components or control and allow access to the electro-mechanic components, a camera driver to control and allow access to an embedded image capture device, audio drivers to control and allow access to one or more audio devices.

The PMIC 1014 may manage power provided to various components of the UE 1000. In particular, with respect to the processors 1002, the PMIC 1014 may control power-source selection, voltage scaling, battery charging, or DC-to-DC conversion.

In some embodiments, the PMIC 1014 may control, or otherwise be part of, various power saving mechanisms of the UE 1000 including DRX as discussed herein. A battery 1018 may power the UE 1000, although in some examples the UE 1000 may be mounted deployed in a fixed location, and may have a power supply coupled to an electrical grid. The battery 1018 may be a lithium ion battery, a metal-air battery, such as a zinc-air battery, an aluminum-air battery, a lithium-air battery, and the like. In some implementations, such as in vehicle-based applications, the battery 1018 may be a typical lead-acid automotive battery.

Figure 4:
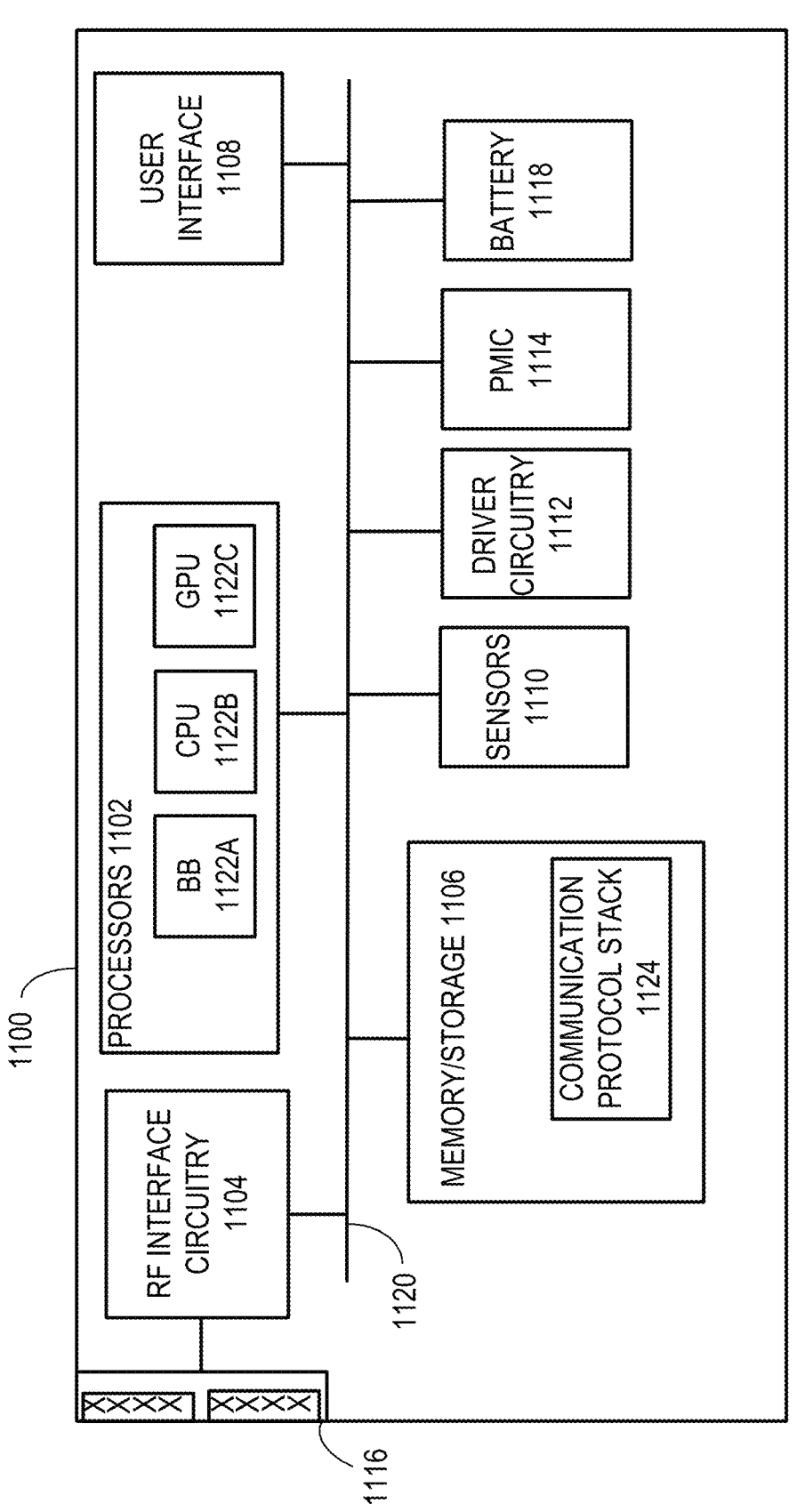
FIG. 4 illustrates an access node according to various exemplary embodiments.

FIG. 4 illustrates an access node 1100 (e.g., a base station or gNB), in accordance with some embodiments. The access node 1100 may be similar to and substantially interchangeable with base station X104. The access node 1100 may include processors 1102, RF interface circuitry 1104, core network (CN) interface circuitry 1106, memory/storage circuitry 1108, and antenna structure 1110.

The components of the access node 1100 may be coupled with various other components over one or more interconnects 1112. The processors 1102, RF interface circuitry 1104, memory/storage circuitry 1108 (including communication protocol stack 1114), antenna structure 1110, and interconnects 1112 may be similar to like-named elements shown and described with respect to FIG. 3. For example, the processors 1102 may include processor circuitry such as, for example, baseband processor circuitry (BB) 1116A, central processor unit circuitry (CPU) 1116B, and graphics processor unit circuitry (GPU) 1116C.

The CN interface circuitry 1106 may provide connectivity to a core network, for example, a 5th Generation Core network (5GC) using a 5GC-compatible network interface protocol such as carrier Ethernet protocols, or some other suitable protocol. Network connectivity may be provided to/from the access node 1100 via a fiber optic or wireless backhaul. The CN interface circuitry 1106 may include one or more dedicated processors or FPGAs to communicate using one or more of the aforementioned protocols. In some implementations, the CN interface circuitry 1106 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to an access node 1100 that operates in an NR or 5G system (for example, a gNB), and the term "E-UTRAN node" or the like may refer to an access node 1100 that operates in an LTE or 4G system (e.g., an eNB). According to various embodiments, the access node 1100 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the access node 1100 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by the access node 1100; a MAC/PHY split wherein RRC, PDCP, RLC, and MAC layers are operated by the CRAN/vBBUP and the PHY layer is operated by the access node 1100; or a "lower PHY" split wherein RRC, PDCP, RLC, MAC layers and upper portions of the PHY layer are operated by the CRAN/vBBUP and lower portions of the PHY layer are operated by the access node 1100.

In V2X scenarios, the access node 1100 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

PIN Discovery and Selection

PIN Setup with PIN Elements

Figure 5:
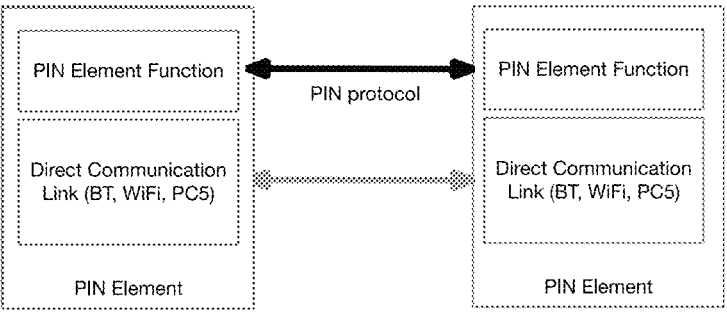
FIG. 5 illustrates PIN element functions running on top of Non-3GPP (Bluetooth or WiFi) connections or on top of NR PC5 Direct Communication according to various exemplary embodiments.

A PIN element offers one or more of PIN Services (these are corresponding to the functionality offered by the PIN element, some examples are audio output device, printer device, display device, etc.). A PIN may be configured to support only specific services. The following provides two exemplary methods by which PIN elements discover and join a PIN. Both exemplary methods are running on top of Non-3GPP (Bluetooth or WiFi) connections or on top of NR PC5 Direct Communication as shown in FIG. 5.

Figure 6:
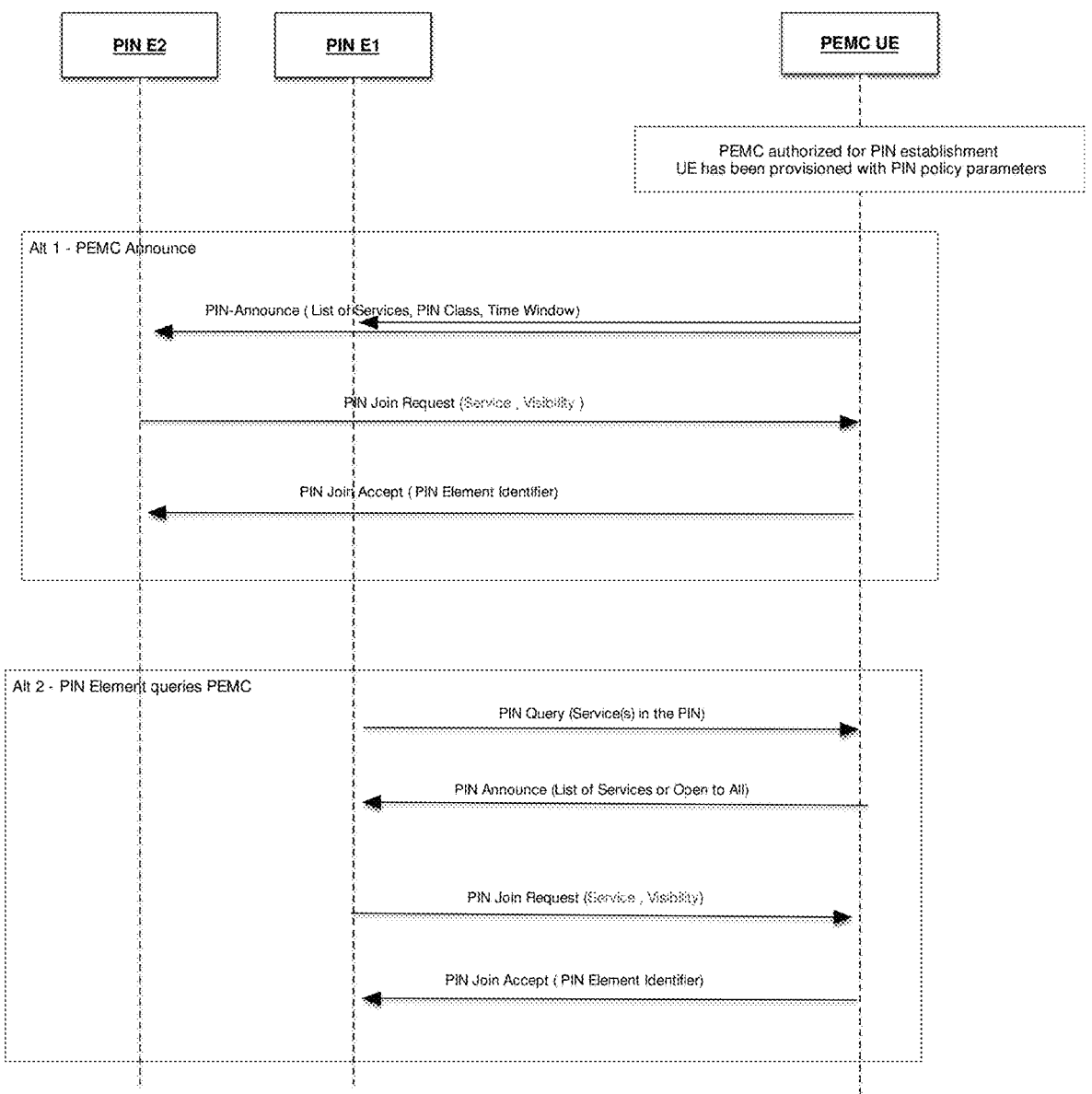
FIG. 6 illustrates two exemplary methods of PIN element discovery according to various exemplary embodiments.

FIG. 6 illustrates two exemplary methods of PIN element discovery according to various exemplary embodiments. In the example call flows, there are two PIN elements (PIN E1 and PIN E2) and a PEMC.

In the first exemplary method, the PEMC periodically sends PIN related information and waits for a response within a time window. The broadcast information may include PIN identifier, PIN services offered (including services over 5GS), a PIN Class (open to all or restricted), the time window within which PEMC expects join requests from the PIN elements, etc.

A PIN is created by the PEMC that periodically announces PIN parameters. This could be parallel transmissions on multiple connections (Bluetooth links) or broadcast (WiFi, PC5).

The PIN elements receive the broadcast announcement from the PEMC and depending on their local configurations decide whether to join the PIN or wait for another PEMC broadcast. When joining the PIN, a PIN element sends a PIN Join Request. This PIN Join Request may include the services the PIN element offers in the PIN, whether the PIN element can be discovered by other PIN elements within the PIN or discovered by devices that are external to the PIN, etc. The PIN Join request can also carry security credentials that enables the PEMC to validate a PIN element and add it to the PIN.

A PIN Join Accept is sent by the PEMC through which the PIN element is informed of its PIN Element Identifier. The PIN Join Accept may also include a PIN Element Identifier for a PEGC applicable for this PIN element.

In the second exemplary method, a PIN element initiates the discovery by sending out a query (on WiFi, BT) and waits for response. The PEMC announces PIN related information in response to this query. The information in the announcement is similar to the information in the announcement for the first exemplary method, e.g., PIN identity, PIN services, PIN status (open to all or restricted), time window within which PEMC expects "PIN Join" requests from PIN elements, etc. The PIN element may then send a PIN Join request and receive a PIN Join accept in the same manner as was described above for the first exemplary method.

PIN Setup with Non-PIN Elements

Figure 7:
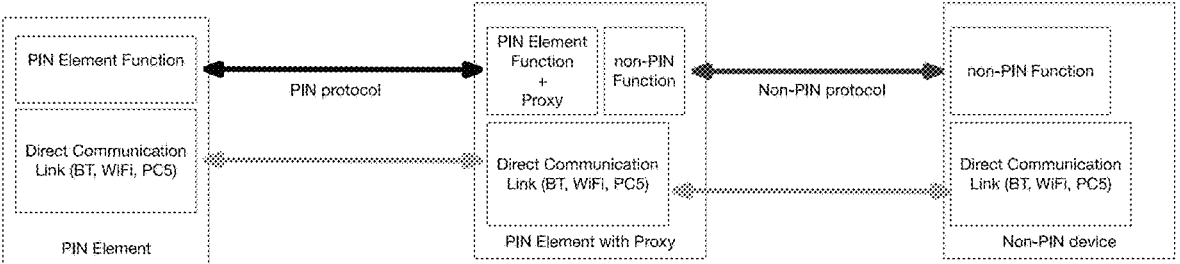
FIG. 7 illustrates a configuration allowing non-PIN elements to be added to a PIN according to various exemplary embodiments.

FIG. 7 illustrates a configuration allowing non-PIN elements to be added to a PIN according to various exemplary embodiments. As shown in FIG. 7, a PIN element may act as a Proxy for the non-PIN element. A PIN element can act as a proxy to include Non-PIN elements (devices which do not have a PIN element function). A PIN element can act as a proxy for multiple non-PIN elements. The PIN proxy is assigned PIN Element Identifier(s) for the non-PIN element (s) it is representing. Thus, the PIN proxy may perform one or both of the exemplary discovery methods described above to allow the corresponding non-PIN element to join the PIN.

Open and Restricted PIN Discovery

As described above, when a PIN element joins a PIN, it may signal a PIN status for the PIN element. There are three broad classes of PIN: Private PIN (e.g., home network), Public PIN (e.g., shopping mall), and Personal Body area PIN (e.g., smart watch, smart glasses). A PIN may support two types of discovery for the PIN element—open and restricted discovery. In an open discovery any PIN element can attempt to join the PIN. The restricted discovery allows only PIN elements which have been configured with the PIN information to join. This configuration could be based on user input or local configuration in devices.

Figure 8:
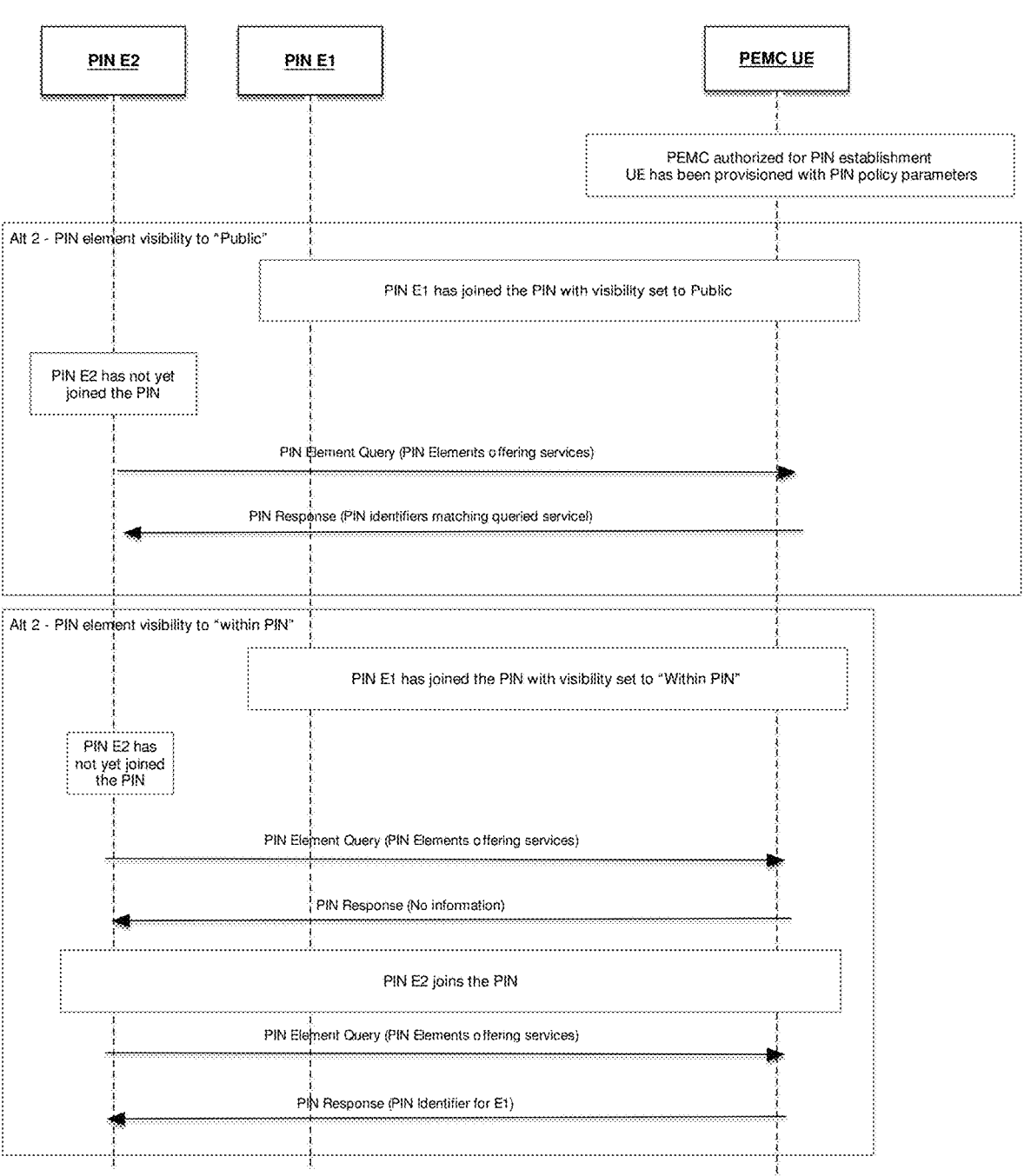
FIG. 8 illustrates a first exemplary method open PIN element discovery and a second exemplary method for restricted PIN element discovery according to various exemplary embodiments.

FIG. 8 illustrates a first exemplary method open PIN element discovery and a second exemplary method for restricted PIN element discovery according to various exemplary embodiments. In the example call flows of FIG. 8, there are two PIN elements (PIN E1 and PIN E2) and a PEMC.

In the examples of FIG. 8, it may be considered that the PEMC offers a lookup service, where in a PIN element (either a member of the PIN or one that has not yet joined the PIN) is able to query for a PIN element identifier corresponding to a service. As described above, a PIN element can set its visibility when joining a PIN. PIN elements can also indicate whether they want to share their information to other elements by PEMC. PIN element visibility can be set to {Private=PIN element cannot be looked up by other PIN elements}, {Restricted=PIN element can be discovered by other members of the PIN}, {Public=PIN element can be discovered by anyone querying for it, irrespective of whether they are a member of the PIN or not}.

The first call flow shown in FIG. 8 includes the scenario where the PIN element visibility is set to public (e.g., the visibility of PIN E1). Thus, when PIN E2 (that is not currently a member of the PIN) queries for a service offered by the PIN E1, the PEMC will respond with the services offered by PIN E1 because of the public setting.

In contrast, the second call flow shown in FIG. 8 includes the scenario where the PIN element visibility is set to within the PIN (e.g., the visibility of PIN E1). Thus, when PIN E2 (that is not currently a member of the PIN) queries for a service offered by the PIN E1, the PEMC will not show services offered by PIN E1. However, after PIN E2 becomes a member of the PIN, the PEMC will respond to a subsequent query by PIN E2 with the services offered by PIN E1.

Discovery and Selection of PEGC

A UE capable of PEGC functionality is authorized for PIN operation by the 5GC. A PEGC joins a PIN as a PIN element using, for example, one of the above described discovery methods. Along with the services, the PIN element may also indicate in the PIN Join request that it is capable of functioning as a PIN Gateway (PEGC).

Figure 9:
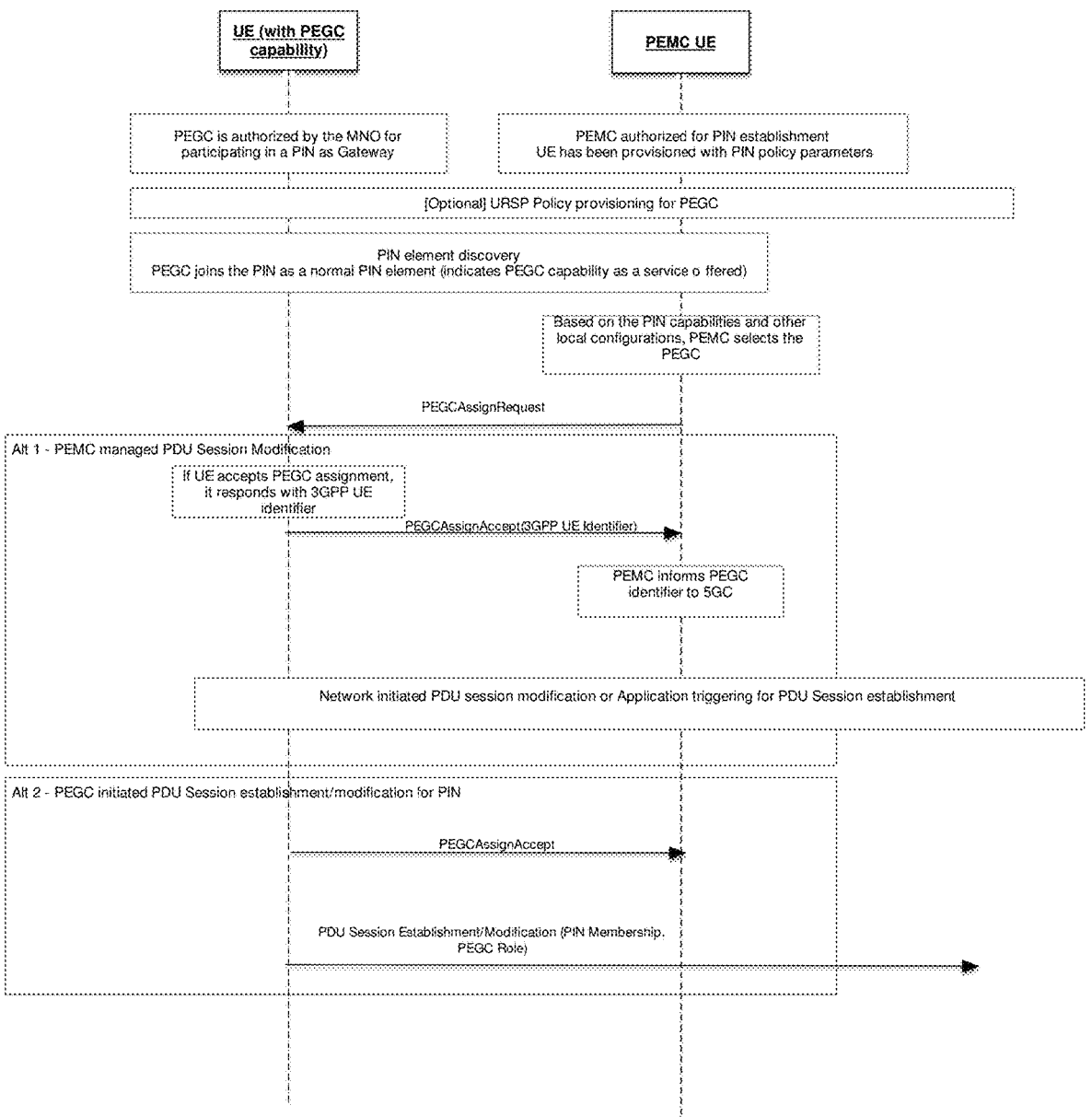
FIG. 9 shows two exemplary methods for a PIN element to be configured as a PIN element gateway (PEGC) according to various exemplary embodiments.

FIG. 9 shows two exemplary methods for a PIN element to be configured as a PIN element gateway (PEGC) according to various exemplary embodiments. In the example call flows of FIG. 9, there is a PIN elements that has a PEGC capability and a PEMC.

The PEMC selects a PEGC depending on whether it is trusted by the PEMC. This could be based on a pre-configurations. For example, a PEMC can be pre-configured with certain UE identifiers for potentially suitable PEGC (3GPP identifiers e.g., GPSI are used to identify trusted PEGCs). A PEMC can also query within a PIN to find any pre-configured UE that can function as PEGC in the PIN.

The PEMC assigns the role of PEGC by sending a PEGC Assign Request to a PIN element capable of the gateway function. If the PIN element accepts the PEGC assignment, it responds with PEGC Assign Accept. In one exemplary method, the PEGC Assign Accept includes the PEGC UE's 3GPP identifier (e.g., 5G-GUTI). In this exemplary method, the PEMC informs the 5GC about the PEGC selected for this PIN. The 5GC initiates a network initiated PDU Session Modification or uses Application Triggering if the PDU Session is not yet established for the required S-NSSAI/DNN.

In another exemplary method, if the PIN element accepts the PEGC assignment, the PEGC informs the membership of a PIN to the 5GC in PDU Session Establishment/Modification by including the PIN identifier for which it is acting as a PIN Gateway.

A PEGC can also indicate to the PEMC that it wants to stop functioning as a Gateway. This could be due to power consumption limitations or moving out of coverage of cellular network. In this case, PEGC sends a PEGC Release Request to PEMC. The PEMC will run the PEGC selection procedure again and confirms the role change to the former PEGC with a PEGC Release Confirm.

EXAMPLES

In a first example, a method performed by a personal Internet of things (IoT) network (PIN) element, comprising receiving, from a PIN element management capability (PEMC) device, an announcement comprising a PIN identifier, a list of services available via the PIN and a time limit for responding to the announcement, sending, to the PEMC in response to the announcement, a PIN join request comprising one or more services provided by the PIN element and receiving, from the PEMC in response to the PIN join request, a PIN join accept message comprising a PIN Element Identifier assigned to the PIN element.

In a second example, the method of the first example, wherein the announcement is received as one of a Bluetooth transmission, a WiFi broadcast or, a PC5 broadcast.

In a third example, the method of the first example, wherein the announcement further comprises a PIN class indicating whether the PIN is open or restricted.

In a fourth example, the method of the first example, wherein the PIN join request further comprises a visibility parameter for the PIN element, wherein the visibility parameter is set to open to the public or restricted.

In a fifth example, the method of the fourth example, wherein, when the PIN element is open to the public, the one or more services offered by the PIN element are included in announcements from the PEMC when the PIN element is a member of the PIN.

In a sixth example, the method of the fourth example, wherein, when the PIN element is restricted, the one or more services offered by the PIN element are only included in announcements from the PEMC in response to PIN element queries from PIN elements that are members of the PIN.

In a seventh example, the method of the first example, wherein the PIN join request further comprises security credentials for the PIN element.

In an eighth example, the method of the first example, wherein the PIN join accept message further comprises a PIN Element Identifier for a pin element gateway capability (PEGC) device associated with the PIN element, wherein the PIN element is configured to access services external to the PIN via the PEGC.

In a ninth example, the method of the first example, further comprising sending, prior to receiving the announcement, a PIN query message, wherein the announcement is received in response to the PIN query message.

In a tenth example, the method of the first example, further comprising communicating with a non-PIN capable element, executing a PIN proxy related to the non-PIN capable element, receiving, from the PEMC device, a second announcement comprising the PIN identifier, the list of services available via the PIN and a time limit for responding to the second announcement, sending, to the PEMC using the PIN proxy, a second PIN join request comprising one or more services provided by the non-PIN capable element and receiving, from the PEMC in response to the PIN join request, a PIN join accept message comprising a PIN Element Identifier assigned to the PIN proxy for the non-PIN capable element.

In an eleventh example, the method of the first example, wherein the one or more services offered by the PIN element comprise a pin element gateway capability (PEGC), the method further comprising receiving, from the PEMC, a PEGC assignment request.

In a twelfth example, the method of the eleventh example, further comprising sending, to the PEMC in response to the PEGC assignment request, a PEGC assignment accept message comprising a 5G User Equipment identifier for a 5G network corresponding to the PIN element and establishing a protocol data unit (PDU) session initiated by the 5G network.

In a thirteenth example, the method of the eleventh example, further comprising sending, to the PEMC in response to the PEGC assignment request, a PEGC assignment accept message indicating the PEGC assignment request is accepted by the PIN element and establishing a protocol data unit (PDU) session with a 5G network.

In a fourteenth example, the method of the thirteenth example, further comprising sending, to the PEMC, a PEGC release request indicating the PIN element wants to stop providing the PEGC service and receiving, from the PEMC in response to the PEGC release request, a PEGC release confirm message confirming the PIN element is no longer providing the PEGC service.

In a fifteenth example, a method performed by a personal Internet of things (IoT) network (PIN) management capability (PEMC) device comprising sending an announcement comprising a PIN identifier, a list of services available via the PIN and a time limit for responding to the announcement, receiving, from a PIN element in response to the announcement, a PIN join request comprising one or more services provided by the PIN element and sending, to the PIN element in response to the PIN join request, a PIN join accept message comprising a PIN Element Identifier assigned to the PIN element.

In a sixteenth example, the method of the fifteenth example, wherein the announcement is sent as one of a Bluetooth transmission, a WiFi broadcast or, a PC5 broadcast.

In a seventeenth example, the method of the fifteenth example, wherein the announcement further comprises a PIN class indicating whether the PIN is open or restricted.

In an eighteenth example, the method of the fifteenth example, wherein the PIN join request further comprises a visibility parameter for the PIN element, wherein the visibility parameter is set to open to the public or restricted.

In a nineteenth example, the method of the eighteenth example, wherein, when the PIN element is open to the public, the one or more services offered by the PIN element are included in announcements from the PEMC when the PIN element is a member of the PIN.

In a twentieth example, the method of the eighteenth example, wherein, when the PIN element is restricted, the one or more services offered by the PIN element are only included in announcements from the PEMC in response to PIN element queries from PIN elements that are members of the PIN.

In a twenty first example, the method of the fifteenth example, wherein the PIN join request further comprises security credentials for the PIN element, the method further comprising validating the PIN element based on the security credentials.

In twenty second example, the method of the fifteenth example, wherein the PIN join accept message further comprises a PIN Element Identifier for a pin element gateway capability (PEGC) device associated with the PIN element.

In a twenty third example, the method of the fifteenth example, further comprising receiving, from the PIN element prior to sending the announcement, a PIN query message, wherein the announcement is sent in response to the PIN query message.

In a twenty fourth example, the method of the fifteenth example, wherein the one or more services offered by the PIN element comprise a pin element gateway capability (PEGC), the method further comprising sending, to the PIN element, a PEGC assignment request and receiving, from the PIN element in response to the PEGC assignment request, a PEGC assignment accept message indicating the PEGC assignment request is accepted by the PIN element.

In a twenty fifth example, the method of the twenty fourth example, wherein the PEGC assignment accept message comprises a 5G UE identifier for a 5G network corresponding to the PIN element, the method further comprising sending, to the 5G network, the 5G UE identifier corresponding to the PIN element.

In a twenty sixth example, the method of the twenty fifth example, further comprising determining, prior to sending the PEGC assignment request, whether the PIN element is a trusted PIN element for operating as a PEGC.

In a twenty seventh example, the method of the twenty sixth example, wherein the determining is based on an identification of the PIN element being preconfigured in the PEMC as a trusted PIN element.

In a twenty eighth example, the method of the twenty seventh example, wherein the identification of the PIN element comprises one of a General Public Subscription Identifier (GPSI) or a Subscription Concealed Identifier (SUCI).

In a twenty ninth example, the method of the twenty fourth example, further comprising querying, one or more PIN elements within the PIN, to determine whether any of the one or more PIN elements are preconfigured to operate as a PEGC.

In a thirtieth example, the method of the twenty fourth example, further comprising receiving, from the PIN element, a PEGC release request indicating the PIN element wants to stop providing the PEGC service and sending, to the PIN element in response to the PEGC release request, a PEGC release confirm message confirming the PIN element is no longer providing the PEGC service.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described methods may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

We claim:

1. A processor of a personal Internet of things (IoT) network (PIN) element configured to:
   receive, from a PIN element management capability (PEMC) device, an announcement comprising a PIN identifier and a list of services available via the PIN and a time limit for responding to the announcement;
   send, to the PEMC in response to the announcement, a PIN join request comprising at least one or more services provided by the PIN element and a visibility parameter indicating whether the PIN element is discoverable by other PIN elements within the PIN; and
   receive, from the PEMC in response to the PIN join request, a PIN join accept message comprising a PIN Element Identifier assigned to the PIN element.

2. The processor of claim 1, wherein the visibility parameter is set to public or restricted.

3. The processor of claim 2, wherein, when the PIN element is public, the one or more services offered by the PIN element are included in announcements from the PEMC when the PIN element is a member of the PIN.

4. The processor of claim 2, wherein, when the PIN element is restricted, the one or more services offered by the PIN element are only included in announcements from the PEMC in response to PIN element queries from PIN elements that are members of the PIN.

5. The processor of claim 1, wherein the PIN join request further comprises security credentials for the PIN element.

6. The processor of claim 1, wherein the PIN join request further comprises a capability of the PIN element.

7. The processor of claim 6, wherein the capability comprises the PIN element is capable of operating as a pin element gateway capability (PEGC) or a second PEMC.

8. The processor of claim 7, wherein the PIN element is capable of operating as the PEGC and the processor is further configured to:

receive, from the PEMC, a PEGC assignment request.

9. The processor of claim 1, wherein the PIN join accept message further comprises a PIN Element Identifier for a pin element gateway capability (PEGC) device associated with the PIN element, wherein the PIN element is configured to access services external to the PIN via the PEGC.

10. The processor of claim 1, wherein the processor is further configured to:

communicate with a non-PIN capable element;

execute a PIN proxy related to the non-PIN capable element;

receive, from the PEMC device, a second announcement comprising the PIN identifier and the list of services available via the PIN and a time limit for responding to the second announcement;

send, to the PEMC using the PIN proxy, a second PIN join request comprising one or more services provided by the non-PIN capable element; and receive, from the PEMC in response to the PIN join request, a PIN join accept message comprising a PIN Element Identifier assigned to the PIN proxy for the non-PIN capable element.

11. A processor of a personal Internet of things (IoT) network (PIN) management capability (PEMC) device configured to:

send an announcement comprising a PIN identifier and a list of services available via the PIN and a time limit for responding to the announcement;

receive, from a PIN element in response to the announcement, a PIN join request comprising at least one or more services provided by the PIN element and a visibility parameter indicating whether the PIN element is discoverable by devices within the PIN; and send, to the PIN element in response to the PIN join request, a PIN join accept message comprising a PIN Element Identifier assigned to the PIN element.

12. The processor of claim 11, wherein the announcement is sent as one of a Bluetooth transmission, a WiFi broadcast or, a PC5 broadcast.

13. The processor of claim 11, wherein the announcement further comprises a PIN class indicating whether the PIN is open or restricted.

14. The processor of claim 11, wherein the PIN join request further comprises a further visibility parameter for the PIN element, wherein the further visibility parameter is set to public or restricted.

15. The processor of claim 14, wherein, when the PIN element is public, the one or more services offered by the PIN element are included in announcements from the PEMC when the PIN element is a member of the PIN.

16. The processor of claim 14, wherein, when the PIN element is restricted, the one or more services offered by the PIN element are only included in announcements from the PEMC in response to PIN element queries from PIN elements that are members of the PIN.

17. The processor of claim 11, wherein the PIN join request further comprises security credentials for the PIN element and the processor is further configured to:

validate the PIN element based on the security credentials.

18. The processor of claim 11, wherein the PIN join request further comprises a capability of the PIN element.

19. The processor of claim 18, wherein the capability comprises the PIN element is capable of operating as a pin element gateway capability (PEGC) or a second PEMC.

20. The processor of claim 19, wherein the PIN element is capable of operating as the PEGC and the processor is further configured to:

send, to the PIN element, a PEGC assignment request; and receive, from the PIN element in response to the PEGC assignment request, a PEGC assignment accept message indicating the PEGC assignment request is accepted by the PIN element.

* * * * *